(12) United States Patent
Lutzmayr et al.

(10) Patent No.: US 11,714,439 B2
(45) Date of Patent: Aug. 1, 2023

(54) SUPPLY CIRCUIT AND ELECTRONIC DEVICE

(71) Applicant: charismaTec OG, Graz (AT)

(72) Inventors: Dieter Lutzmayr, Graz (AT); Sandra Slavinec, Graz (AT)

(73) Assignee: charismaTec OG, Graz (AT)

( * ) Notice: Subject to any disclaimer, the term of this patent is extended or adjusted under 35 U.S.C. 154(b) by 0 days.

(21) Appl. No.: 17/692,378

(22) Filed: Mar. 11, 2022

(65) Prior Publication Data

US 2022/0300018 A1    Sep. 22, 2022

(30) Foreign Application Priority Data

Mar. 17, 2021 (DE) .................. 10 2021 106 508.9
Jul. 22, 2021 (DE) .................. 10 2021 119 020.7

(51) Int. Cl.
*G05F 1/56* (2006.01)
*H05B 47/10* (2020.01)

(52) U.S. Cl.
CPC .............. *G05F 1/56* (2013.01); *H05B 47/10* (2020.01)

(58) Field of Classification Search
None
See application file for complete search history.

(56) References Cited

U.S. PATENT DOCUMENTS

| | | | | |
|---|---|---|---|---|
| 5,450,003 A | * | 9/1995 | Cheon | G06F 1/3203 323/272 |
| 5,864,221 A | * | 1/1999 | Downs | B60L 3/0092 320/134 |
| 6,347,796 B1 | * | 2/2002 | Grossman | A63F 13/98 206/320 |
| 6,452,362 B1 | | 9/2002 | Choo | |
| 7,471,061 B2 | * | 12/2008 | Shah | H02J 9/061 307/66 |
| 9,413,170 B2 | * | 8/2016 | Henkel | G06F 1/30 |
| 11,079,783 B2 | * | 8/2021 | Inoue | G05F 1/563 |
| 11,460,902 B2 | * | 10/2022 | Grant | G06F 1/3287 |
| 2003/0076051 A1 | | 4/2003 | Bowman et al. | |

(Continued)

FOREIGN PATENT DOCUMENTS

DE     102020113565 B3    11/2021

OTHER PUBLICATIONS

Lutzmayr et al. "Mobile Low Power Document Verifier" Campus 02 Fachhochschule der Wirtschaft GmbH, Graz, Austria, published Apr. 2015.

(Continued)

*Primary Examiner* — Thomas J. Hiltunen
(74) *Attorney, Agent, or Firm* — Eschweiler & Potashnik, LLC

(57) ABSTRACT

A supply circuit has a first and a second terminal for connecting an accumulator, a third and a fourth terminal for connecting at least one battery, and an output terminal. A voltage regulator is connected to the first terminal on the input side and to a fifth terminal on the output side. An undervoltage detection circuit is adapted to activate the voltage regulator when a voltage at the first terminal is greater than a threshold voltage. A reverse polarity protection device is coupled between the third terminal and the output terminal. A blocking diode is coupled between the fifth terminal and the output terminal.

11 Claims, 2 Drawing Sheets

(56) References Cited

U.S. PATENT DOCUMENTS

| | | |
|---|---|---|
| 2005/0127871 A1 | 6/2005 | Orikasa |
| 2006/0232133 A1* | 10/2006 | Cha .................. H02J 9/062 |
| | | 307/23 |
| 2009/0021216 A1 | 1/2009 | Hills et al. |
| 2009/0051223 A1 | 2/2009 | Woo |
| 2011/0127943 A1* | 6/2011 | Oto ................. H01M 16/006 |
| | | 320/101 |
| 2011/0310689 A1* | 12/2011 | Hayden ............... G11C 5/147 |
| | | 307/64 |
| 2012/0013196 A1* | 1/2012 | Kim .................... H02J 7/34 |
| | | 307/82 |
| 2013/0043929 A1* | 2/2013 | Chen ................... G06F 1/263 |
| | | 327/535 |
| 2017/0094732 A1 | 3/2017 | Spartano et al. |
| 2021/0368599 A1 | 11/2021 | Lutzmayr |

OTHER PUBLICATIONS

CharismaTec OG, "Doculus Lumus User Manual Version 3.0" Published Jan. 23, 2021.

* cited by examiner

SUPPLY CIRCUIT AND ELECTRONIC DEVICE

REFERENCE TO RELATED APPLICATIONS

This application claims priority to German Application number 10 2021 106 508.9, filed on Mar. 17, 2021 & German Application number 10 2021 119 020.7, filed on Jul. 22, 2021. The contents of the above-referenced Patent Applications are hereby incorporated by reference in their entirety.

FIELD

The present disclosure relates to a supply circuit and to an electronic device having such a supply circuit. In particular, the supply circuit is suitable for portable electronic devices.

BACKGROUND

Portable electronic devices are usually powered by batteries or accumulators. When accumulators are used, they are either permanently installed in the electronic device or can be removed from the device or replaced as an exception. However, accumulators are usually not standardized, but differ both in the voltage they provide and in a variety of possible sizes. This makes it difficult to operate the electronic device when the capacity of the accumulator is exhausted.

Conventional batteries and even rechargeable batteries for electronic devices are an alternative to accumulators, but cannot replace them for capacity and/or environmental reasons.

SUMMARY

The present disclosure provides an improved supply concept for supplying portable electronic devices, with which greater flexibility and/or greater supply reliability can be achieved.

The improved supply concept is based on the idea that a supply circuit can provide a supply voltage alternatively either from an accumulator or from at least one battery. Therein, the accumulator is to serve as the primary supply source, especially as long as the capacity available in the accumulator is sufficient. However, if a certain capacity level or a certain voltage level from the accumulator is not reached, the output voltage of the supply circuit can or should be provided from the at least one battery. For example, the battery voltage is only used when a voltage supplied from the accumulator is no longer sufficient. Thus, the use of batteries can be limited and at the same time a high flexibility of the application can be enabled. This can also increase the supply reliability of a circuit connected to the supply circuit.

Accordingly, an embodiment of a supply circuit according to the improved supply concept, for example for an electronic device, comprises a first and a second terminal for connecting an accumulator, the second terminal being connected to a reference potential terminal. Further, a third and a fourth terminal for connecting at least one battery are provided, the fourth terminal being connected to the reference potential terminal or a further reference potential terminal. The supply circuit further comprises a voltage regulator connected on the input side to the first terminal and on the output side to a fifth terminal, and an undervoltage detection circuit arranged to compare a voltage at the first terminal with a threshold voltage and to activate the voltage regulator when the voltage at the first terminal is greater than the threshold voltage. A reverse polarity protection device is coupled between the third terminal and an output terminal of the supply circuit. Furthermore, the supply circuit comprises a blocking diode, e.g. a Schottky diode, coupled to the fifth terminal on the anode side and to the output terminal on the cathode side.

The accumulator and the at least one battery are not necessarily part of the supply circuit. The voltage regulator is designed, for example, as a linear regulator, such as a longitudinal regulator or a low-drop longitudinal regulator. Such longitudinal regulators are also known as low-drop-out regulators, LDO.

The voltage regulator fulfills the function, for example, of converting a voltage provided by a connected accumulator to a desired constant voltage, which in the present embodiment is provided at the fifth terminal. However, in order for the voltage regulator to operate, it is activated by the undervoltage detection circuit when a sufficiently high voltage is present at the first terminal. For example, without activation by the undervoltage detection circuit, the voltage regulator is in a deactivated state so that no voltage is supplied to the fifth terminal.

For example, the undervoltage detection circuit is thereby configured to output a logical detection signal depending on the comparison of the voltage at the first terminal with the threshold voltage. Such a detection signal can then be used to activate the voltage regulator. Alternatively or additionally, the detection signal can also be evaluated by a powered circuit, for example, in order to adjust operating states and/or signal the charge state of the accumulator based on it.

Thus, when the voltage provided by the accumulator is sufficiently high and the voltage regulator is activated accordingly, the voltage provided by the voltage regulator at the fifth terminal is output to the output terminal via the reverse diode connected in the forward direction. Accordingly, the output voltage supplied in this state is supplied from the accumulator.

However, if the voltage at the accumulator is too low, a voltage provided by the at least one battery can be fed to the output terminal via the reverse polarity protection device. At the same time, it is ensured that incorrectly inserted or connected batteries are not taken into account, so to speak, for the voltage supplied at the output terminal. In addition, it can be prevented that currents flow from the output terminal into the batteries when the batteries are connected and the voltage regulator is activated.

To achieve reverse polarity protection when batteries are inserted incorrectly, a diode can be used to protect the circuit, which is polarized in the flow direction from the third terminal to the output terminal, resulting in a voltage drop across this diode.

In one alternative embodiment the reverse polarity protection device is implemented with a p-channel enhancement transistor, e.g. a field-effect transistor or MOSFET, whose drain terminal is coupled to the third terminal, whose source terminal is coupled to the output terminal and whose gate terminal is coupled with low impedance, e.g. directly, to the fifth terminal and with high impedance to the fourth terminal.

For example, such a p-channel enhancement transistor inherently has a bulk diode that is forward biased between drain and source. For example, the p-channel enhancement transistor conducts when the potential at the gate terminal becomes more negative than the potential at the source terminal by a forward threshold. When a correctly poled positive voltage is applied between the third and fourth terminals, the bulk diode conducts first, so that essentially the voltage delivered by the battery arrives at the source terminal, reduced only by a voltage drop across the bulk diode. Because of the high-impedance connection of the gate terminal to the fourth terminal, i.e., the other, negative battery terminal, the gate potential is essentially the same as the potential of the negative terminal of the battery. Since the voltage at the source terminal is now more positive than the forward threshold, the transistor conducts with low channel resistance, thus bypassing the bulk diode drop.

On the other hand, when a negative voltage with the wrong polarity is applied to the third terminal, the bulk diode blocks and the MOSFET does not reach the conducting state.

However, when a voltage, especially a sufficiently high voltage, is output from the voltage regulator at the fifth terminal, the gate terminal is not pulled to the potential at the fourth terminal by the high-impedance connection, but corresponds to the voltage output from the voltage regulator. Accordingly, the transistor does not enter the conductive state, but is further disabled. This prevents the use or discharge of a connected battery. Likewise, accidental charging of this battery is prevented. The undervoltage detection circuit can also prevent the battery from being deep discharged when its capacity is too low, which could cause damage to the electrodes of the battery. The undervoltage detection circuit can be designed, for example, as a comparator with or without hysteresis.

Thus, with the improved supply concept it is achieved that devices with connected accumulator, for example lithium ion or lithium polymer accumulators, can additionally be supplied with batteries, whereby the changeover takes place automatically. In addition, the supply circuit is protected against incorrectly inserted batteries. Priority power is supplied from the accumulator. Furthermore, deep discharge protection for the accumulator is ensured by automatic disconnection of the circuit branch of the accumulator, i.e. primarily the voltage regulator, and minimization of further discharge after disconnection. If the accumulator recovers, i.e. can deliver a sufficiently high voltage again, another short-term emergency function can be provided.

There is an automatic switchover to a supply from connected batteries when the accumulator is empty. The batteries may remain connected, regardless of whether the accumulator is full or empty. In addition, an almost loss-free reverse polarity protection for connected batteries is ensured.

If a detection signal is emitted by the undervoltage detection circuit, voltage monitoring of the active voltage source can be performed in a connected circuit despite possible different voltage levels, for example via a microcontroller in the supplied circuit.

In various embodiments, the supply circuit further comprises a charge controller for charging an accumulator connected to the first and second terminals. The charge controller is supplied, for example, via an externally provided charge current or charge voltage.

For example, the charge controller is coupled to the first and second ports to enable charging of the accumulator.

The charge controller may also be arranged to supply the voltage regulator. For example, a voltage output from the charge controller at the first terminal can be processed directly by the voltage regulator if it is sufficiently high to activate the voltage regulator by means of the undervoltage detection circuit.

If no accumulator is installed or connected, or if the accumulator is defective, a voltage can still be supplied to the output terminal by means of inserted or connected batteries. This additionally enables a flexible use of the supply circuit.

A supply circuit according to any of the previously described embodiments can be used, for example, in an electronic device for powering the electronic device. Such an electronic device is, for example, portable.

For example, such an electronic device includes a housing that houses a battery connected to the first and second terminals and includes a lockable battery compartment having battery contacts connected to the third and fourth terminals. For example, by lockable battery compartment it is understood that batteries can be inserted and removed from the battery compartment in a simple manner by opening and closing the battery compartment. This can be achieved, for example, with various latching, clamping or screwing mechanisms, all of which prevent the electronic device from being fully opened.

The electronic device is designed, for example, as a light magnifier comprising one or more magnifying lenses for optical magnification of an object and at least one light-emitting element for illumination of the object. The light emitting element is thereby powered by a voltage provided at the output terminal. For example, the electronic device also includes a drive circuit arranged to drive the at least one light emitting element based on the voltage provided by the supply circuit.

BRIEF DESCRIPTION OF THE DRAWINGS

The improved supply concept is explained in more detail below by means of example embodiments with reference to the drawings. Here, similar elements or elements with the same functions are designated with the same reference signs. Therefore, a repeated explanation of individual elements is omitted where necessary.

In the drawings.

DETAILED DESCRIPTION

Figure 1:
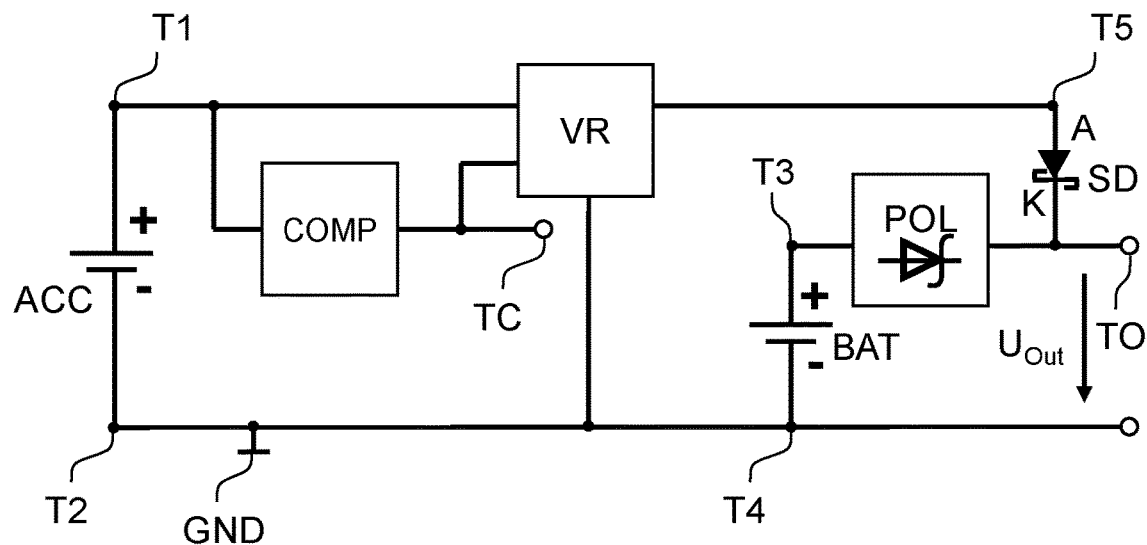
FIG. 1 shows an example of a supply circuit.

FIG. 1 shows an embodiment of a supply circuit according to the improved supply concept, which can be used for example for an electronic device, e.g. a portable electronic device. The supply circuit comprises a first and a second terminal T1, T2 for connecting an accumulator ACC, which is not a mandatory component of the supply circuit. The second terminal T2 is connected to a reference potential terminal GND. The supply circuit further comprises a third and a fourth terminal T3, T4 for connecting at least one battery BAT, which is also not a mandatory component of the supply circuit. The fourth terminal T4 is connected to the reference potential terminal GND. Alternatively, a further reference potential terminal could also be provided, so that the fourth terminal T4 is connected to this further reference potential terminal. The supply circuit further comprises an output terminal TO.

The supply circuit contains a voltage regulator VR, which is connected on the input side to the first terminal T1 and on the output side to a fifth terminal T5, and an undervoltage detection circuit COMP. The undervoltage detection circuit COMP is coupled to the first terminal T1, in particular to evaluate the voltage at the first terminal T1. On the output side, the undervoltage detection circuit COMP is connected to the voltage regulator VR, as well as to a comparison terminal TC. The undervoltage detection circuit COMP is thereby set up to compare a voltage at the first terminal T1 with a threshold voltage and to activate the voltage regulator VR if the voltage at the first terminal T1 is greater than the threshold voltage. In the active state, the voltage regulator VR generates at its output, i.e. at the fifth terminal T5, a correspondingly regulated voltage based on the voltage provided at the first terminal T1.

Furthermore, a blocking diode SD is provided, which in this example is designed as a Schottky diode and is coupled to the fifth terminal T5 on the anode side and to the output terminal TO on the cathode side.

The supply circuit further comprises a reverse polarity protection device POL coupled between the third terminal T3 and the output terminal TO. The undervoltage detection circuit COMP is designed, for example, as a comparator which monitors a voltage of the connected accumulator ACC. Only if this voltage is above a defined threshold voltage, the voltage regulator VR is activated, so that only in this condition a regulated voltage is output at the fifth terminal T5. The undervoltage detection circuit COMP is designed, for example, with a hysteresis so that the voltage regulator VR is switched off below a defined value. The hysteresis is set to a value of approximately 0.2 V, for example. This allows the system to be used again, at least for a short time, when the ACC accumulator is almost but not yet completely empty.

If the system is supplied by the accumulator, this can be signaled via a corresponding detection signal at the terminal TC, for example to a microcontroller of a supplied useful circuit. Thus, for example, the software of the microcontroller can react to the voltage level of the ACC accumulator and/or the status can be signaled to a user.

The voltage of the voltage regulator VR is supplied to the output terminal TO via the blocking diode SD, which is polarized in the forward direction with respect to the output terminal TO.

If the accumulator is empty, i.e. an output voltage is lower than the specified threshold voltage, the voltage regulator VR is switched off or no longer activated by the undervoltage detection circuit COMP. This prevents or greatly minimizes the quiescent current from the ACC accumulator.

If no ACC accumulator is installed or connected, the VR voltage regulator also remains switched off.

The reverse polarity protection device POL between the third terminal T3 and the output terminal TO prevents, on the one hand, an incorrectly connected battery, i.e. with reversed polarity, from acting on the output terminal TO. On the contrary, voltage transmission or current flow is only enabled when the polarity is correct. In addition, the combination of reverse polarity protection device POL and blocking diode SD also prevents a connected battery BAT from being used when voltage regulator VR is activated. Instead, a battery BAT can only be used for power supply when the VR voltage regulator is deactivated.

Thus, a primary supply of a supplied circuit at the output terminal TO is ensured by the accumulator ACC, while in case of too low capacity of the accumulator or too low voltage, respectively, it is switched over to the use of the battery voltage.

Figure 2:
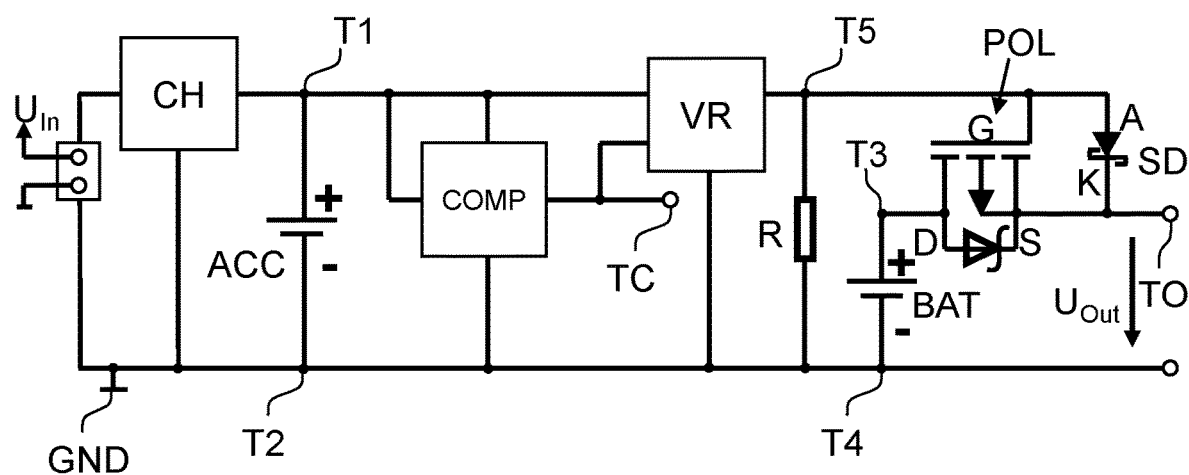
FIG. 2 shows another embodiment of a supply circuit.

FIG. 2 shows a further example of a supply circuit, which is basically based on the embodiment described in FIG. 1. Accordingly, only deviations from the embodiment shown in FIG. 1 are referred to below.

For example, the undervoltage detection circuit COMP is additionally connected to the first and second terminals T1, T2 to provide a power supply to the circuit COMP.

In the embodiment shown, the reverse polarity protection device POL is formed by a p-channel enhancement transistor whose drain terminal is coupled to the third terminal T3, whose source terminal is coupled to the output terminal TO and whose gate terminal is coupled with low resistance, e.g. directly to the fifth terminal T5. Furthermore, the gate terminal is coupled to the fourth terminal T4, i.e., the negative battery terminal, via a high-impedance resistor R, approximately of the order of 1 MO. The p-channel enhancement transistor has an inherent bulk diode between the drain terminal and the source terminal. The p-channel transistor conducts only when the potential at the gate terminal becomes more negative than the potential at the source terminal by a forward threshold. Therefore, when the voltage regulator VR is activated and thus provides a voltage at the fifth terminal T5, a conducting state of the transistor cannot be achieved. Accordingly, current flow from the battery BAT to the output terminal TO is not possible when the voltage regulator VR is activated. Likewise, charging of the battery BAT from the voltage regulator VR is consequently also prevented.

When the voltage regulator VR is deactivated, the high-impedance connection of the fourth and fifth terminals T4, T5 via the resistor R pulls the gate potential to the potential of the negative battery terminal. If the battery polarity is incorrectly connected, i.e. if there is a positive voltage at the fourth terminal T4, the transistor is again inherently prevented from conducting.

If the polarity of the battery BAT is correct, a current flow occurs through the positive-polarized bulk diode, so that essentially the positive battery voltage arrives at the source terminal, reduced only by a voltage drop across the bulk diode. Because the voltage at the source terminal is now more positive than the forward threshold voltage, the p-channel enhancement transistor conducts and only a small channel resistance stands in the way of the current. Current flow from the output terminal TO towards the fifth terminal T5 is prevented by the blocking diode SD. The blocking diode SD thus prevents the p-channel enhancement transistor from switching itself off.

The detection signal at the terminal TC can thus further signal to a user that a supply is being provided from the battery BAT.

It should be noted that the function of the reverse polarity protection device POL is also controlled by the state of terminal T5, in particular its potential, so that the battery BAT is not charged.

FIG. 2 also shows an optional charge controller CH in the supply circuit, which is set up to charge an accumulator connected to the first and second terminals T1, T2. The charge controller CH is powered, for example, by an externally provided voltage supply. If designed accordingly, the charge controller CH can also be set up to supply the voltage regulator, so that operation of the supply circuit with activated voltage regulator VR is possible even when the accumulator is not connected. As soon as the external voltage supply to the charge controller CH is no longer available, the supply circuit switches automatically to battery operation.

The supply circuit can be used, for example, in an electronic device to supply power to the electronic device.

Figure 3:
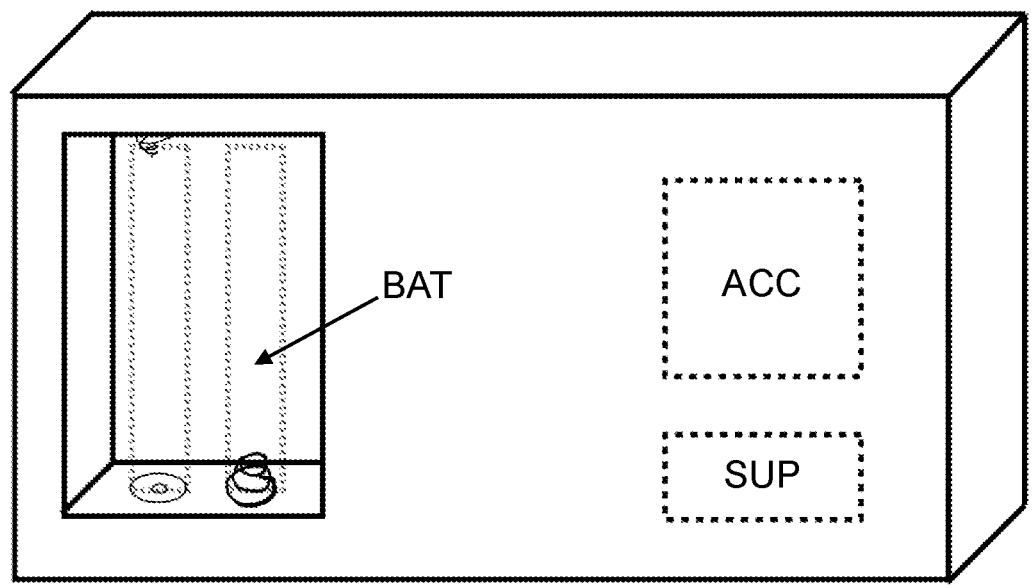
FIG. 3 shows an example embodiment of an electronic device with a supply circuit.

FIG. 3 shows an embodiment of such an electronic device, e.g. in portable form, with a supply circuit SUP according to one of the embodiments described above and an accumulator ACC connected to the first and second terminals T1, T2. The electronic device has a battery compartment with battery contacts connected to the third and fourth terminals T3, T4. In the embodiment example, two battery cells, such as conventional AA batteries, are schematically indicated, which provide their voltage to the supply circuit SUP via the corresponding battery contacts. However, the application is not limited to such battery cells.

The battery compartment is e.g. lockable so that the batteries can be changed easily. The ACC accumulator, on the other hand, is permanently installed in the housing and is not accessible to a user, at least not without having to open and possibly damage the housing.

The electronic device is designed, for example, as a light magnifier comprising one or more magnifying lenses for optical magnification of an object and at least one light-emitting element for illumination of the object. The at least one light-emitting element is thereby supplied based on the voltage provided at the output terminal TO. For this purpose, for example, a driver circuit is provided as a useful circuit in the electronic device.

The improved supply concept enables a backup option for a user when the accumulator is empty, especially when used in mobile devices, without having to make mechanical modifications such as removing the accumulator. This minimizes a risk of loss or damage. Furthermore, especially when a charge controller is provided in the supply circuit, no switching or resetting is necessary when the electronic device is charged with the supply circuit, respectively the accumulator. In particular, a supplied circuit or an electronic device can continue to be used while the accumulator is being charged.

Switching between operation by means of an accumulator and operation by means of a battery does not require any electromechanical components. The switchover is fully automatic. The use of the supply circuit can be parameterized during manufacture by optionally installing an accumulator and/or a charging circuit. The provision of a battery compartment can also be parameterized during production as an assembly or mounting option.

A built-in accumulator is maximally protected by the minimized discharge current with deactivated voltage regulator. The reverse polarity protection device also makes incorrect operation of the supply circuit virtually impossible.

The supply circuit is basically independent of the type of accumulator used and/or the capacity of the accumulator. In addition, the batteries of any capacity can also be used. In particular, the use of rechargeable batteries at the battery terminals is also possible.

With appropriate dimensioning of the supply circuit, automatic switching is also possible at higher power levels. Furthermore, field-effect transistor technology, especially with appropriate MOSFETs, also allows voltages up to approximately 20 V to be realized.

What is claimed is:

1. A supply circuit comprising
a first and a second terminal for connecting an accumulator, the second terminal being connected to a reference potential terminal;
a third and a fourth terminal for connecting at least one battery, the fourth terminal being connected to the reference potential terminal or to a further reference potential terminal;
an output terminal;
a voltage regulator connected on an input side to the first terminal and on an output side to a fifth terminal;
an undervoltage detection circuit adapted to compare a voltage at the first terminal with a threshold voltage and to activate the voltage regulator when the voltage at the first terminal is greater than the threshold voltage;
a reverse polarity protection device coupled between the third terminal and the output terminal; and
a blocking diode comprising an anode at an anode side and a cathode at a cathode side, which is coupled to the fifth terminal on the anode side and to the output terminal on the cathode side,
wherein the reverse polarity protection device consists of a single p-channel enhancement transistor whose drain terminal is directly coupled to the third terminal, whose source terminal is coupled to the output terminal and whose gate terminal is coupled with a low impedance to the fifth terminal and with high resistance, greater than the low impedance, to the fourth terminal.

2. The supply circuit according to claim 1, wherein the undervoltage detection circuit is adapted to output a logical detection signal as a function of the comparison of the voltage at the first terminal with the threshold voltage.

3. The supply circuit according to claim 1, wherein the voltage regulator is in a deactivated state without activation by the undervoltage detection circuit.

4. The supply circuit according to claim 1, wherein the voltage regulator is implemented as one of a linear regulator, a longitudinal regulator or a low-drop longitudinal regulator, LDO.

5. The supply circuit according to claim 1, further comprising a charge controller for charging an accumulator connected to the first and second terminals.

6. The supply circuit according to claim 5, wherein the charge controller is adapted to supply the voltage regulator.

7. The supply circuit according claim 1, wherein the blocking diode is implemented with a Schottky diode.

8. An electronic device comprising the supply circuit according to claim 1 for supplying power to the electronic device.

9. The electronic device according to claim 8, comprising a housing, in which an accumulator connected to the first and second terminals is built-in and which comprises a lockable battery compartment having battery contacts connected to the third and fourth terminals.

10. The electronic device according to claim 8, which is implemented as a light magnifier comprising one or more magnifying lenses for optically magnifying an object and at least one light emitting element for illuminating the object, wherein the light emitting element is powered by a voltage provided at the output terminal.

11. The electronic device according to claim 1, wherein the source terminal of the single p-channel enhancement transistor is directly connected to the output terminal.

* * * * *